United States Patent [19]
Horan

[11] Patent Number: 6,149,081
[45] Date of Patent: Nov. 21, 2000

[54] METHOD AND APPARATUS FOR THE CONVERSION OF POLYPROPYLENE TWINE INTO FIBRES

[76] Inventor: Gary Horan, 4520 - 50 Street, Stony Plain, Alberta, Canada, T7Z 1L6

[21] Appl. No.: 09/220,373

[22] Filed: Dec. 24, 1998

[30] Foreign Application Priority Data

Dec. 24, 1997 [CA] Canada .................................. 2225933

[51] Int. Cl.⁷ ...................................................... B02C 19/12
[52] U.S. Cl. .................................. 241/3; 241/15; 241/38; 241/101.4
[58] Field of Search .................................. 241/15, 16, 3, 241/101.4, 38

[56] References Cited

U.S. PATENT DOCUMENTS

5,271,805  12/1993  Stockel et al. ............................. 241/16

*Primary Examiner*—Mark Rosenbaum

[57] ABSTRACT

A method and apparatus is provided for the processing of polypropylene fiber from polypropylene twine. The material may be produced from feedstock after its first instance of usage. The feedstock may have residual contamination resultant from its first instance of usage. The method is provided to collect feedstock in skeins, sever the skeins into bundles, wash, disinfect and pH neutralize the surface of the feedstock, cut to length and reduce the feedstock to a fibrous clean, dry state suitable for use as a reinforcement or additive to composite material.

6 Claims, 8 Drawing Sheets

FIG. 6

METHOD AND APPARATUS FOR THE CONVERSION OF POLYPROPYLENE TWINE INTO FIBRES

TECHNICAL FIELD

The present invention is directed to a method and apparatus for processing used polypropylene twine into fibres suitable for use as secondary reinforcement additives.

BACKGROUND OF THE INVENTION

It is well known to use polypropylene fibres have been used as a secondary reinforcement additive to concrete. As well, work has been done with polypropylene fibres in shotcrete, asphalt and other composite materials. However the fibres used have been manufactured from virgin resin which adds cost to the concrete and overlooks the potential resource of used polypropylene material.

The agricultural community generates many thousands of metric tonnes of used polypropylene baler twine during the normal course of its activities. Polypropylene twine is used to bale hay and straw by farmers and ranchers. After its first instance of usage the used polypropylene twine is normally discarded and transported to landfills. This discarded polypropylene twine is problematic for landfill operators as it tends to wrap around crawler tractor undercarriages thereby causing premature wear and damage to exposed bearings and lubrication seals. Incineration of polypropylene is not a optimal alternative because of the production of noxious gases. Incineration of this material creates environmental air quality concerns.

Used polypropylene twine is usually contaminated with hay, straw, twine and fecal matter. It is difficult to process because it is collected in tangled piles and is of varying lengths. For these reasons. traditional methods of recycling polypropylene such as melt and re-extrude, are not effective. As well, the different sources of the polypropylene results in a wide variance in melt temperatures which further complicates prior art recycling methods.

In order to be recycled into fibres suitable for use as a reinforcing additive, the twine must be cleaned, skeined or bundled and cut to pre-determined and uniform lengths, and broken down into individual component fibres.

It would therefore be advantageous to have a method and apparatus for processing the used polypropylene twine into individual component fibres which are suitable for use as a secondary reinforcing material for concrete and other structural materials.

BRIEF DESCRIPTION OF THE DRAWINGS

The preferred embodiments of the invention will now be described with reference to the drawings in which:

FIG. 4 is a sectional view of the apparatus used to untwist the twine segments into individual fibres.

FIGS. 4(A)–4E are a view of an alternate apparatus used to untwist the twine segments into individual fibres and simultaneously dry the fibres.

FIGS. 5, 5A–5B, 6 and 7 are depictions of the shear means of the present invention.

DETAILED DESCRIPTION OF INVENTION

The present invention provides a method and apparatus for recycling used polypropylene twine into useful polypropylene fibres.

In general terms, the method first provides for the bundling of the twine into longitudinal bundles which may be processed using suitable apparatus. The twine may be bundled by skeininig the twine into a coiled bundle which may then be severed to produce a longitudinal bundle or by directly bundling the twine longitudinally. The method next provides for the separation of the polypropylene from the organic materials it may be contaminated with due to exposure to these materials during the normal course of its usage of the first instance such as hay, straw, urine and fecal matter and any other matter it may normally be exposed to. After cleaning the twine is cut into appropriate lengths and the resulting lengths of twine are broken down into individual component fibres. The resulting fibres are then dried and may thereafter be packaged.

1. The Method

In one preferred embodiment, the first step is to skein the material into loose coils in its contaminated state after its first instance of usage. This skeining process takes place after the bale twine is cut and the baled material is separated from the twine. It is preferable that the skeining step take place at the collection site which may be distant from the processing, site although skeining may take place at the processing site. The twine is fed into a skeininig device and when a full skein has been accumulated it is tied off and removed from the skeining device and stored in skcined form until sufficient skeined material has been accumulated to transport to a processing plant.

The next step is to sever the skein at one point transversely to render the skein into a bundle of relatively equal length strands.

In an alternative embodiment, the first step is to bundle the twine into longitudinal bundles in its contaminated state. Because it is convenient to bundle the material at the collection site, a bundler of the type described below is preferably used. The bundle may then be bagged into a bag sleeve which prevents tangling of the bundle and maintains the longitudinal orientation of the twine. The bagged bundles may then be stored or transported for further processing immediately after bagging.

The bundle is then fed into a high pressure washing system via a sandwich feed roller to a sandwich open mesh conveyor past and through a primary high pressure water and detergent jet system. The jets preferably aid in the feed mechanism to assist in the movement of the bundle through the jet washer.

It is desirable to reuse and recycle the effluent from the primary wash by running it past a screening system, a gravel bath and an activated charcoal filtration system to a holding tank for reheating and reuse. The effluent recovered from the primary wash may also be used as a source of compostable material or for use as a field dressing or fertilizer optionally in conjunction with enzymes which may be used to accelerate the breakdown of this material.

The bundle may then be immersed in a soda rinsing bath to neutralize the acidity resulting from residual urine contamination. The soda bath is monitored to maintain an appropriate pH and is replenished or replaced as required.

The bundle may then be immersed in a disinfectant bath to neutralize any bacterial or viral contaminant. Suitable disinfecting agents are well known.

After disinfection, the bundle is then rinsed with clean water to remove the residual soda bath and disinfecting bath material. The final rinse water runs through an activated charcoal filter to a storage tank for reuse.

The bundle of cleaned polypropylene twine is next cut into specified lengths with a shear system consisting of one or preferably a series of guillotine knives. The interval of cut on the polypropylene twine bundle will be determined by the end product specification of the fibre being produced at the time. The interval of cut will be controlled by the spacing between the guillotine knives which cut or sever the polypropylene twine into predetermined lengths.

The cut twine will be removed from the cutting device and transported to a reel or series of reels with alternating herring bone rub bars at clearances determined by the nature of the material being processed. The reels will untwist the twine segments and break down the segments into individual fibres. The reels may be equipped with a water jet or fountain to dampen the surface at the rub bars and the material being processed to control temperature and to facilitate the mechanical untwisting and breaking down of the polypropylene twine segments into individual fibres. Alternatively, it may be necessary to dry the twine segments before this step and to avoid adding water during this processing. Whether or not water is present or added is dependent on the nature of the twine being processed.

The fibre is then collected on a conveyor and runs via a sandwich open mesh conveyor through a hot air drying system at a rate sufficient to produce a thoroughly dry product.

Alternatively, the cut twine segments may be untwisted with a air make-up unit and a venturi leading to a pipe which contains flighting enclosed by the pipe. The flighting contains a central shaft which serves to separate the enclosed flighting pipe into two spiralling tubes. The twine segments are introduced into the pipe through the venturi and are blown through the spiralling tubes. The physical agitation caused by the spiralling motion and the friction against the flighting and air turbulence causes the segments to untwist. This method of untwisting also dries the segments and the end products fibres at the same time. To facilitate the drying process, the incoming air through the air make-up unit may be heated.

2. The Apparatus

The present invention in its apparatus form is, in general terms, a system comprising a skeiner, a bundle maker, a primary jet wash, pH/disinfectant baths, rinse bath, shearing means, untwisting means and a dryer. A skein in this specification shall mean a circular or coiled bundle of twine.

Figure 1:
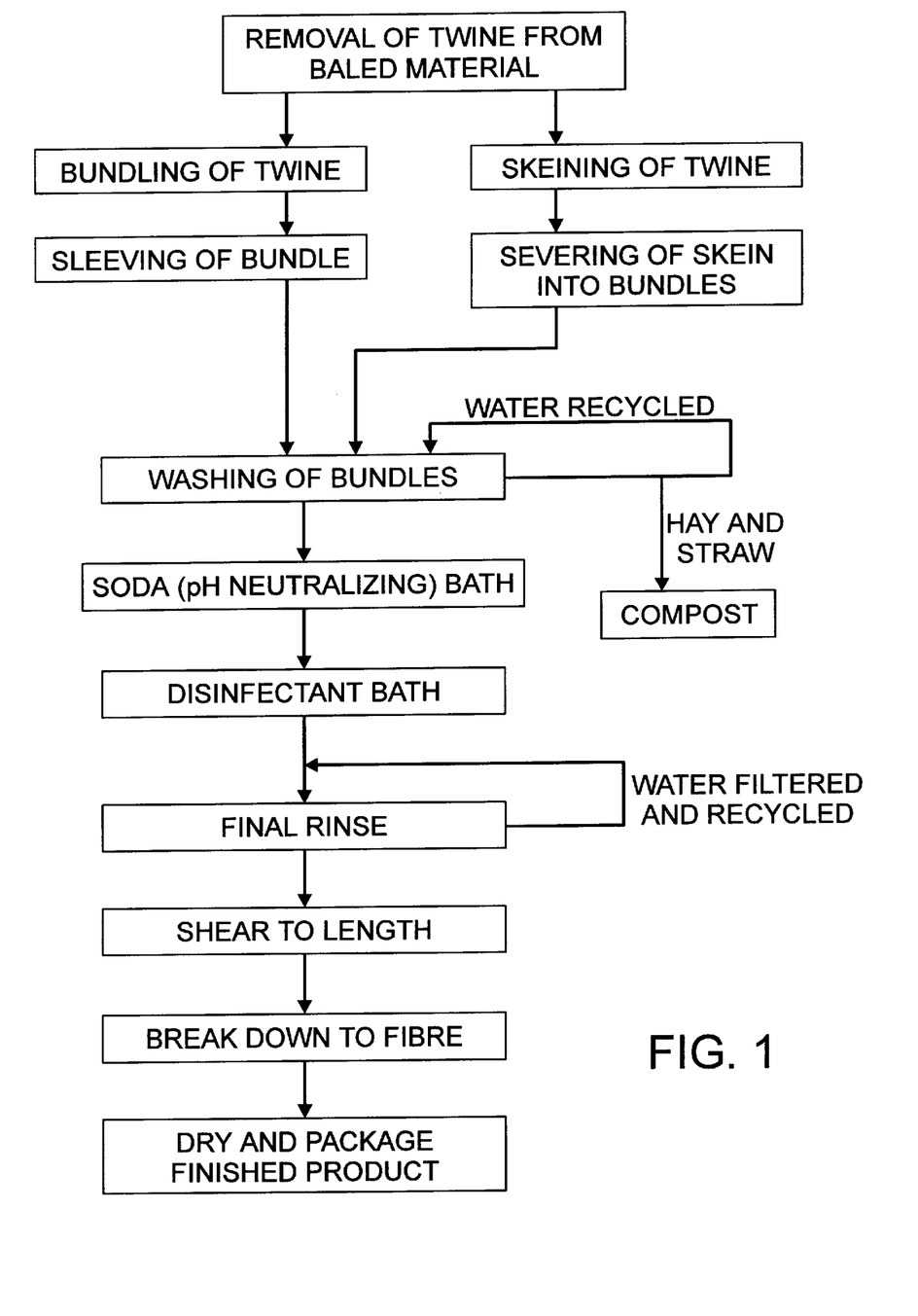
FIG. 1 is a schematic flowchart of the method of the present invention.
Figures 2, 3:
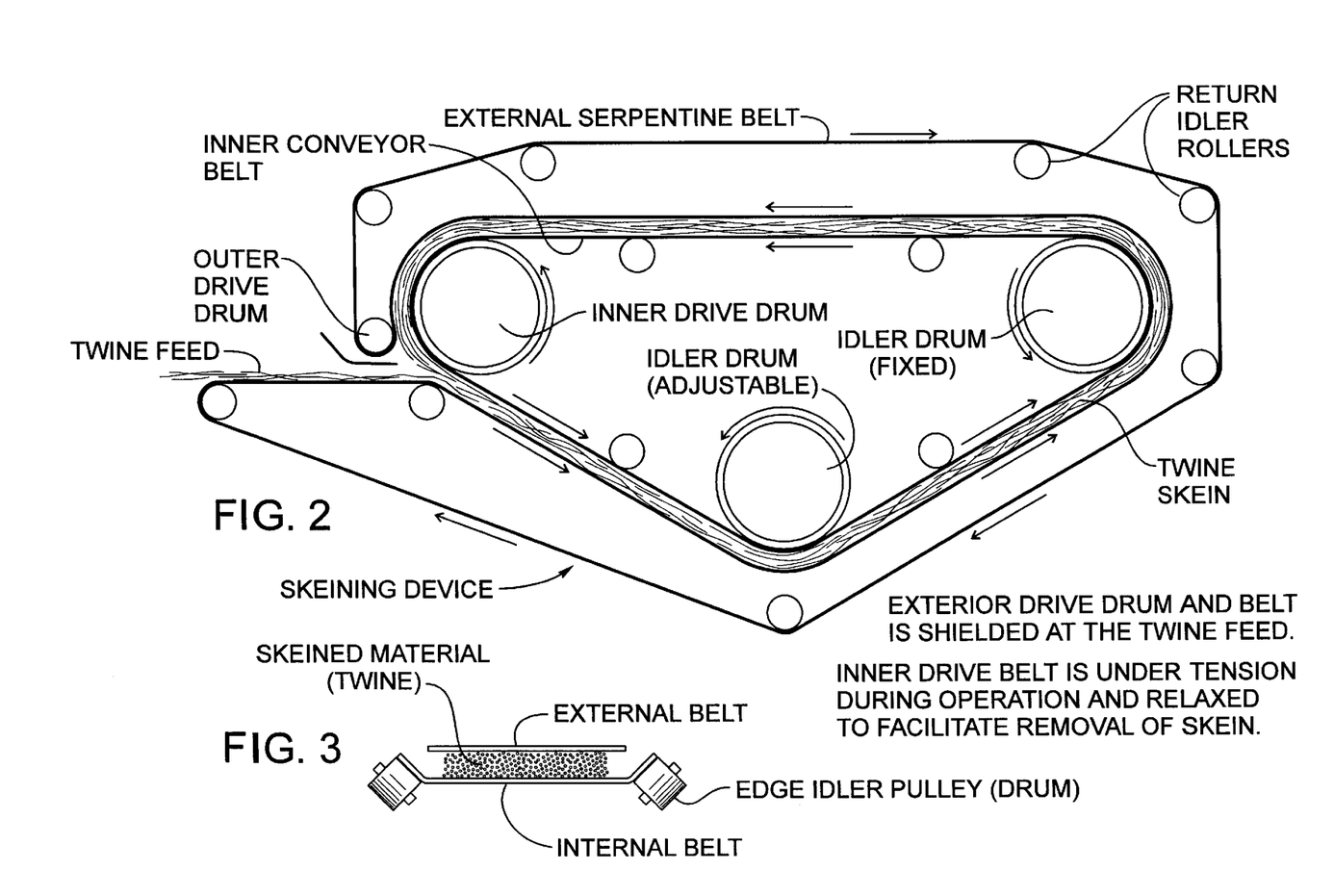
FIG. 2 is a representation of the apparatus of the present invention.
FIG. 3 is a sectional view of the skeiner portion of the apparatus.

When the bale twine is cut and removed from the baled material, it is inserted into a skeiner. As may be seen in FIG. 2, the skeiner comprises an external flat belt conveyor and an internal flat belt conveyor. The external conveyor wraps around the internal conveyor such that the two belts sandwich twine fed between the two belts and carries the twine around in a circular fashion. The internal and external conveyors recirculates the twine through the sandwich conveyor until sufficient strands of twine have been accumulated to form a skein. Once a skein has formed, the internal belt may be loosened to allow removal of the skein.

In the bundle maker, the skein is laid flat and open on a table and a single cut by a blade, severs the skein transversely to the direction of the skein stands rendering the skein into a longitudinal bundle.

Figure 2A:
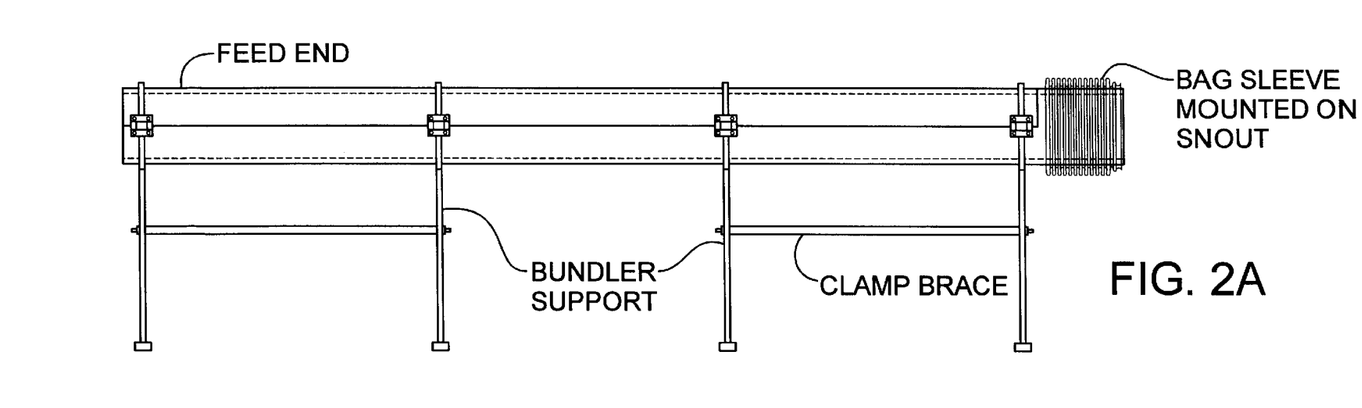
FIGS. 2A–2E are a representation of the longitudinal bundler of an alternative embodiment.
Figure 2B:
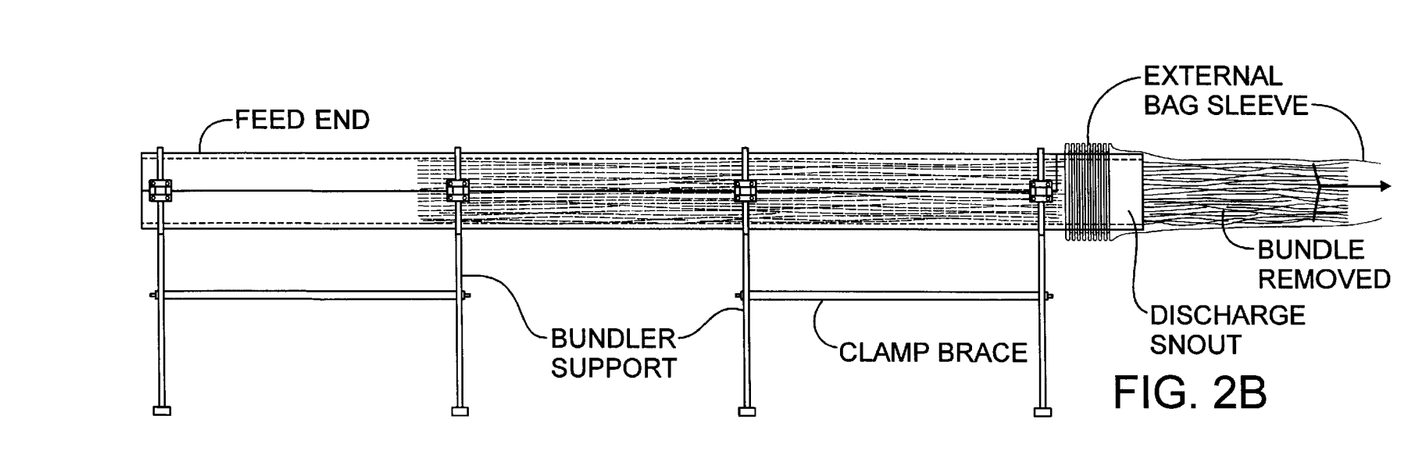
Figures 2C, 2D:
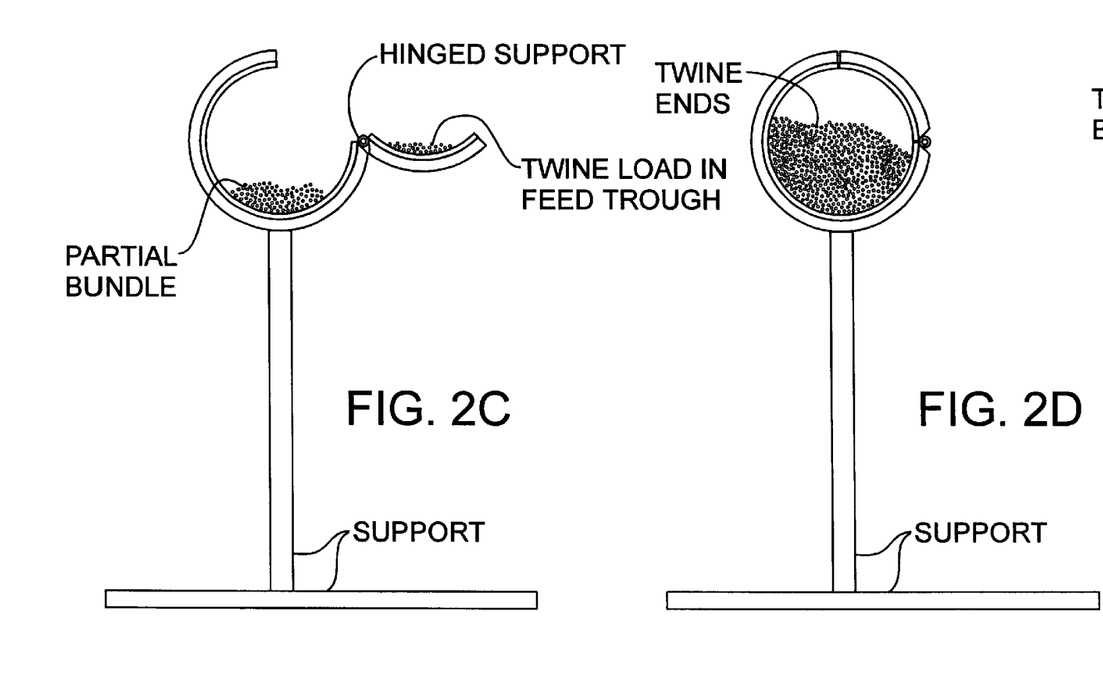
Figure 2E:
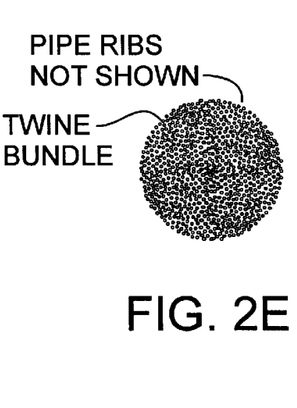

In an alternative embodiment, the apparatus may comprise a longitudinal bundler of the configuration illustrated in FIG. 2A. The longitudinal bundler comprises an elongated trough which has a hinged cover. Preferably, the bundler is raised to approximately waist height and rests on supports or legs. At the snout end of the bundler, the bundler is cylindrical with a circular opening at the end. As may be seen, a bag sleeve fits over the snout to receive the longitudinal bundle after it is formed. In operation, the twine lengths are placed in the bundler with one end aligned at the snout end of the bundler. The cover may be used to collect and stretch the lengths and transferred into the trough from the cover simply by flipping the cover closed. Once sufficient twine is collected to form the bundle, with one end of each length aligned at the snout, the sleeve bag may be slipped over the bundler and the bundle removed, conveniently resulting in a longitudinal bagged bundle.

In the primary jet wash, one end of the longitudinal bundle is fed into a sandwich roller and to a sandwich screen conveyor system that passes through a primary high pressure jet system. The jet system may be used to feed and direct the bundle through the washer. Detergent and/or enzymes may be used to aid in the primary wash process.

The bundle is then transported to the chemical treatment chambers. The first chamber holds a soda rinsing bath. The second chamber holds a disinfectant bath. Finally, the third chamber leads to a final clean water jet rinsing system.

Figures 5A, 5B:
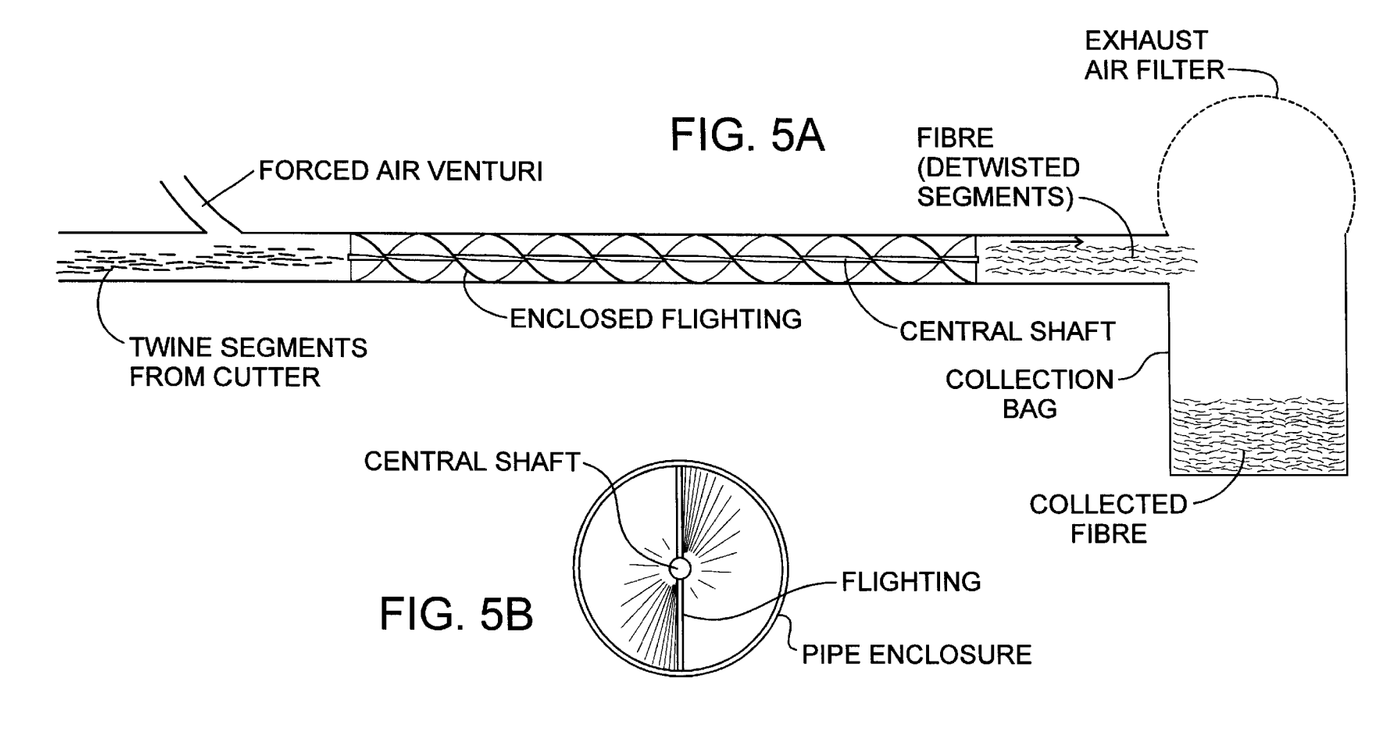
Figure 6:
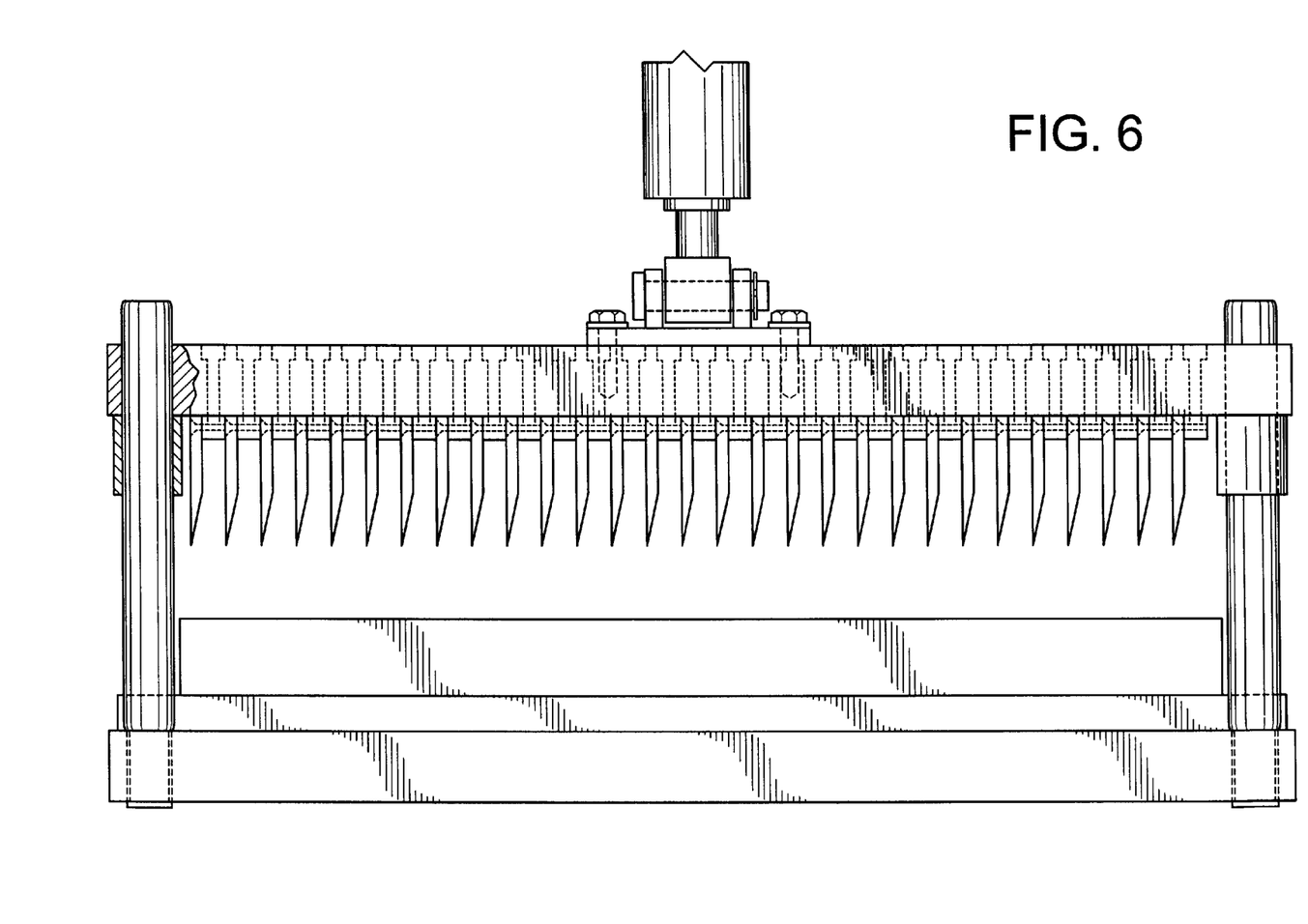
Figure 7:
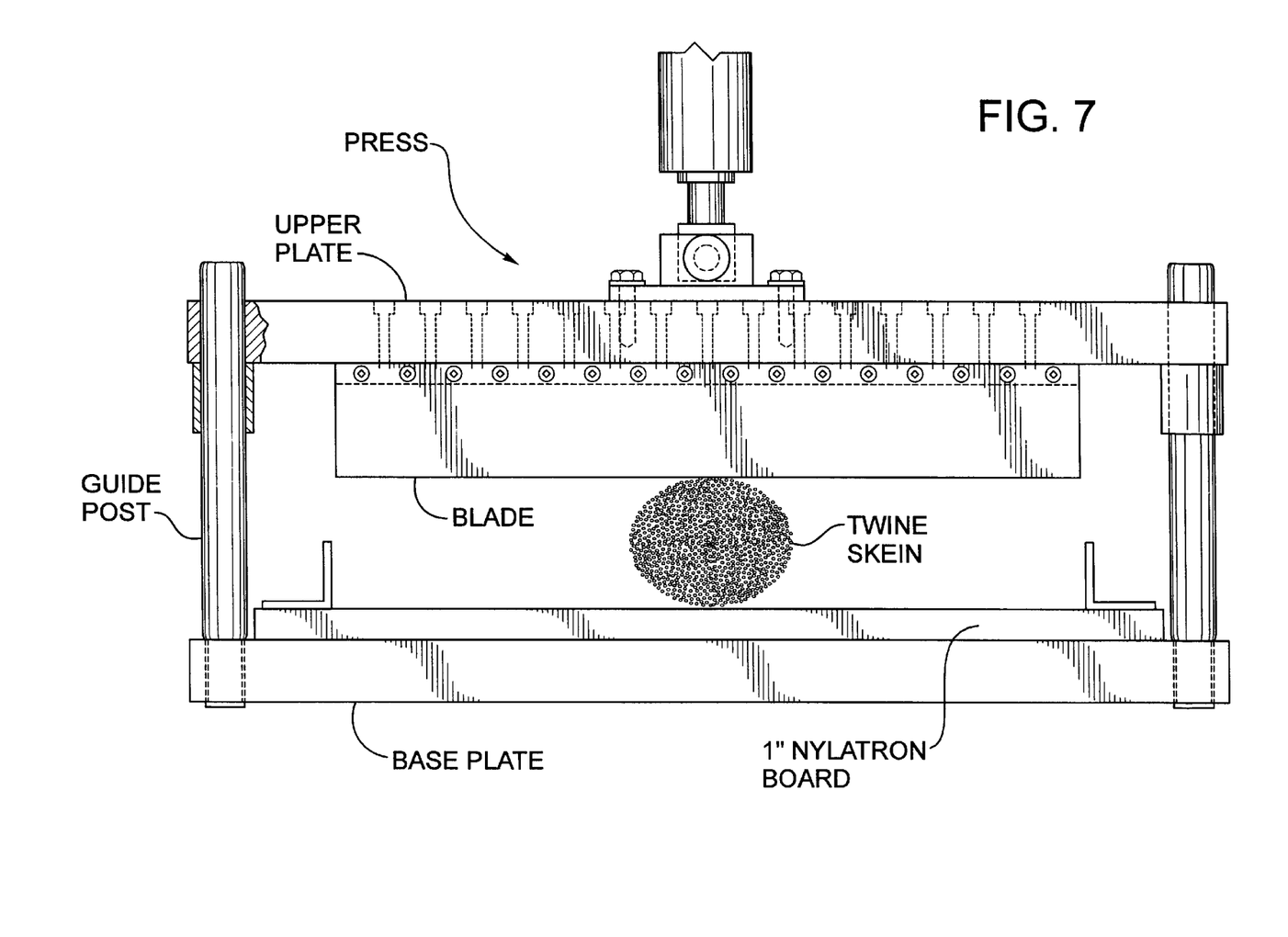

Once cleaned, pH adjusted, disinfected and rinsed, the bundle is then delivered to the shear means. As is illustrated in FIG. 5, the shear means may consist of a conveyor fed cutting table equipped with one or a series of blades to cut or sever the polypropylene twine into predetermined lengths. The interval of cut on the polypropylene twine bundle will be determined by the end product specification of the fibre being produced at the time. The interval of cut will be controlled by the spacing, between the blades.

The cut twine will be removed from the cutting table by an air jet or a scrubber conveyor that will scrub the severed particles of polypropylene twine into a hopper from which the severed polypropylene twine particles will be removed by auger, conveyor or similar means.

The apparatus to untwist the cut twine and break it down to individual fibres comprises a series of reels having an alternating herring bone or any other such pattern with rub bars at clearances determined by the nature of the material being processed. The apparatus may be equipped with a water jet or fountain to dampen the surface at the rub bars and the material being processed to control temperature and to facilitate the mechanical untwisting of the cut polypropylene twine into a fibrous state.

The dryer preferably comprises a sandwich open mesh conveyor that runs through a hot air drying system comprised of but not limited to a forced air furnace feeding positive pressure hot air to the top of the sandwich conveyor by means of a ducting and hood assemble and a negative pressure exhaust system that runs from a hood at the bottom of the sandwich conveyor assembly past a venturi system with a flapper to control the negative air pressure flow and through a hydrocyclone bag system to collect any particulate material and to an external and or internal exhaust system. The positive hot air positive pressure hood is joined to the negative pressure exhaust hood by a sealing strip and side labyrinth baffles adjacent to the open mesh belts of the sandwich conveyor. This drying device may be equipped with a multi stage exhaust manifold in which at various ports in the exhaust manifold the humidity of the exhaust air may be monitored by use of a hydrometer sensor which may or may not be used to regulate the flow of material through the drying device by controlling the speed of the conveyor.

Figure 4A:
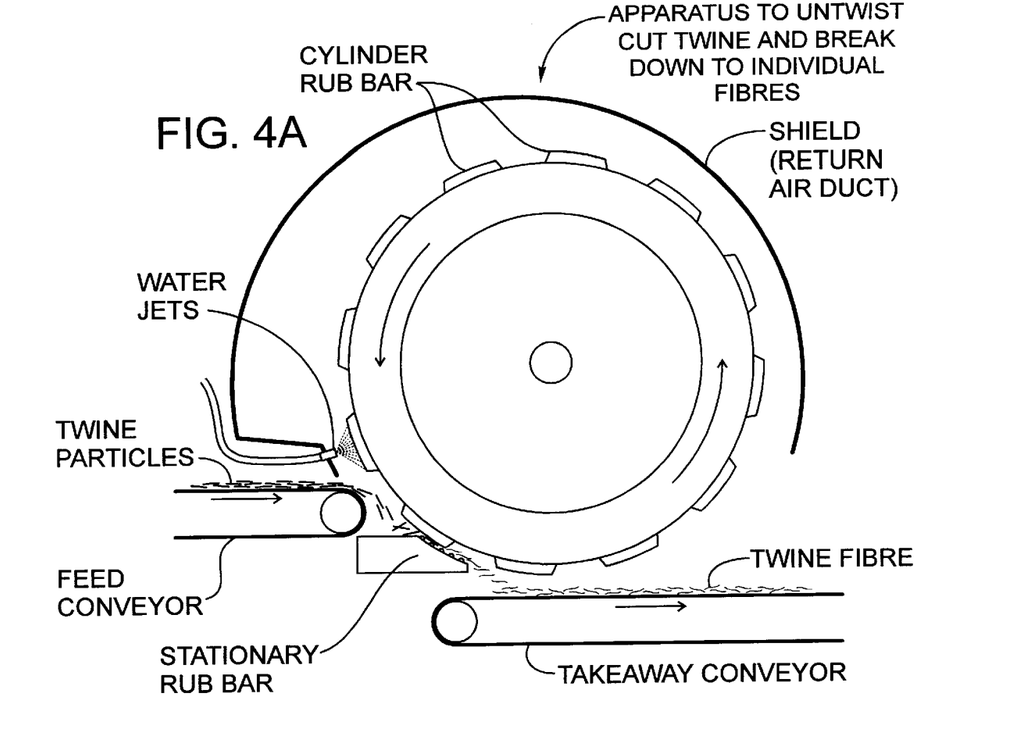
Figure 4B:
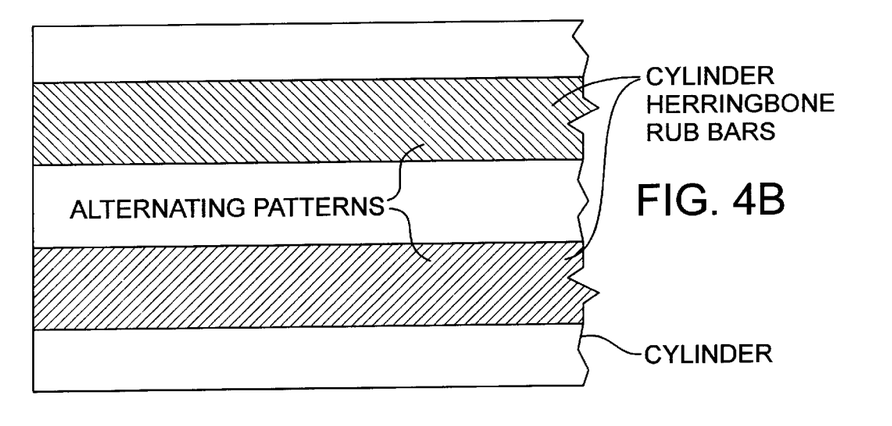
Figure 4C:
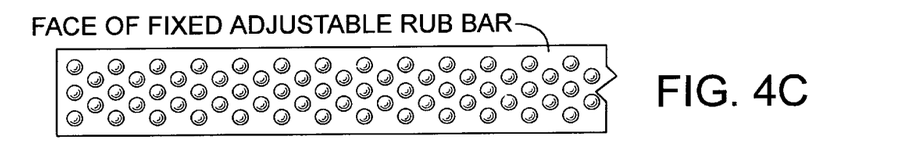

In an alternative embodiment, the untwisting and drying the segments into a end product fibre may be accomplished with an apparatus which comprises an air make-up unit and a flighting enclosed within a pipe, as is illustrated in FIG. 4A. The twine segments from the cutter are introduced into one end of the pipe, just behind a venturi leading from a forced air source which may be heated. The remainder of the pipe contains helical flighting with a central shaft. Preferably, the are two helical flights intertwined around the central shaft. The twine segments are blown through the helical flighting by the forced air which physically agitates the segments and untwists them into individual fibres. The air also dries the segments and the fibres as they tumble through the pipe. Convenient collection means may be provided at the collection end of the pipe. This alternative untwisting means is preferably used for twine segments of a length less than one inch and more preferably less than one-half inch. It is less effective with twine segments that are longer.

Although the embodiments of the invention have been described separately as a method and an apparatus, it will be apparent that a description of the method may also be found in the description of the apparatus. Also, the description of the apparatus may be inferred from the description of the method.

The embodiments of the invention in which an exclusive property or privilege is claimed are defined as follows:

1. A method of processing of polypropylene twine into individual fibres comprising the steps of:
    a) skeining the twine into a circular bundle;
    b) severing the skeined bundle to render it into a longitudinal bundle;
    c) washing the longitudinal bundle;
    d) severing the longitudinal bundle into twine segments of suitable lengths;
    e) untwisting or breaking down the twine segments into individual fibres.

2. The method of claim 1 further comprising the steps of pH adjusting and disinfecting the longitudinal bundle before the severing step.

3. The method of claim 1 or 2 further comprising the step of drying the fibres after the step of untwisting the twine segments.

4. A method of processing of polypropylene twine into individual fibres comprising the steps of:
    a) gathering loose lengths of twine each having a first end and second end;
    b) aligning the twine lengths such that the first ends of each length are aligned creating a longitudinal bundle;
    c) washing the longitudinal bundle;
    d) severing the longitudinal bundle into twine segments of suitable lengths;
    e) untwisting or breaking down the twine segments into individual fibres and simultaneously drying the segment or fibres.

5. A system for processing polypropylene twine into individual fibres comprising:
    (a) a skeiner for producing a skeined bundle of twine and means to sever the skeined bundle into a longitudinal bundle or a bundler for conveniently producing a longitudinal bundle;
    (c) means to wash the longitudinal bundle;
    (d) means to pull neutralize and disinfect the bundle;
    (e) means to sever the longitudinal bundle into twine segments of a suitable length;
    (f) means to untwist the twine segments into individual fibres; and
    (g) means to dry and collect the individual fibres.

6. An apparatus for processing polypropylene twine pieces of varying lengths into individual fibres comprising:
    (a) a bundler comprising a trough having a cylindrical snout for producing a longtitudinal bundle;
    (b) means to wash longitudinal bundle;
    (c) means to pH neutralize and disinfect the bundle;
    (d) means for severing the longitudinal bundle into twine segments of a suitable length; and
    (e) means for simultaneously untwisting the twine segment into individual fibre and drying the segment and fibres.

* * * * *